(12) United States Patent
Gao et al.

(10) Patent No.: US 11,537,550 B2
(45) Date of Patent: Dec. 27, 2022

(54) SERVER AND METHOD OF IDENTIFYING UNSUPPORTED DRIVES IN A SERVER

(71) Applicant: Lenovo Enterprise Solutions (Singapore) Pte. Ltd., New Tech Park (SG)

(72) Inventors: Zhipeng Gao, Jiangsu (CN); Wilson Velez, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 213 days.

(21) Appl. No.: 16/800,337

(22) Filed: Feb. 25, 2020

(65) Prior Publication Data
US 2020/0272593 A1 Aug. 27, 2020

(30) Foreign Application Priority Data
Feb. 25, 2019 (CN) .......................... 201910138743.8

(51) Int. Cl.
| | |
|---|---|
| *G06F 11/07* | (2006.01) |
| *G06F 13/42* | (2006.01) |
| *G06F 9/30* | (2018.01) |
| *G06F 9/4401* | (2018.01) |
| *G06F 9/54* | (2006.01) |
| *G06F 13/40* | (2006.01) |

(52) U.S. Cl.
CPC ...... *G06F 13/4282* (2013.01); *G06F 9/30083* (2013.01); *G06F 9/4418* (2013.01); *G06F 9/542* (2013.01); *G06F 11/0727* (2013.01); *G06F 13/4022* (2013.01); *G06F 2213/0026* (2013.01); *G06F 2213/0028* (2013.01); *G06F 2213/0032* (2013.01)

(58) Field of Classification Search
CPC ............ G06F 13/4282; G06F 13/4022; G06F 2213/0026; G06F 2213/0028; G06F 2213/0032; G06F 9/30083; G06F 9/4418; G06F 9/542; G06F 11/0727
See application file for complete search history.

(56) References Cited

U.S. PATENT DOCUMENTS

| | | | |
|---|---|---|---|
| 2007/0174517 A1* | 7/2007 | Robillard | G06F 11/2089 710/62 |
| 2012/0096190 A1* | 4/2012 | Cardinell | G06F 11/3051 710/16 |
| 2013/0097694 A1* | 4/2013 | Dang | G06F 21/00 726/17 |
| 2018/0004787 A1* | 1/2018 | Kunnathur Ragupathi | G06F 16/2282 |
| 2018/0074717 A1* | 3/2018 | Olarig | G06F 3/0658 |

* cited by examiner

*Primary Examiner* — Ernest Unelus
(74) *Attorney, Agent, or Firm* — Olive Law Group, PLLC

(57) ABSTRACT

A method of identifying an unsupported storage device on a server is disclosed as including providing the server with a baseboard management controller (BMC), the BMC obtaining vital product data (VPD) from a storage device on the server, the BMC comparing the VPD from the storage device with one or more approved VPDs, and the BMC issuing an output in response to said comparison.

16 Claims, 2 Drawing Sheets

SERVER AND METHOD OF IDENTIFYING UNSUPPORTED DRIVES IN A SERVER

CROSS REFERENCE TO RELATED APPLICATION

This application claim priority to Chinese Patent Application No. 201910138743.8, filed on Feb. 25, 2019, and titled SERVER AND METHOD OF IDENTIFYING UNSUPPORTED DRIVES IN A SERVER; the content of which is hereby incorporated by reference herein in its entirety.

This invention relates to a server and a method of identifying unsupported drives in a server.

BACKGROUND OF THE INVENTION

Computer customers tend to find ways to save money on server options, especially new technology storage devices like Non-Volatile Memory Express (NVMe) drives. Challenges have been entered during NVMe drive qualification that shows that full support of NVMe drives requires rigorous testing to provide a stable and robust storage solution. Unfortunately, a customer that does not purchase an approved or qualified NVMe storage option may encounter these compatibility issues and may drive service calls and cost to both the customer and the manufacturer and/or supplier.

There is currently no arrangement in place that restricts a customer from installing non-qualified or non-supported storage devices into a server. This situation may lead to bad customer experience since there may be impacts on loss of data due to incompatibilities with the server and non-qualified/supported NVMe devices.

It is thus an object of the present invention to provide a server and a method in which the aforesaid shortcomings are mitigated or at least to provide a useful alternative to the trade and public.

SUMMARY OF THE INVENTION

According to a first aspect of the present invention, there is provided a method of identifying an unsupported storage device on a server. The method includes providing the server with a baseboard management controller (BMC). The BMC can obtain at least one piece of vital product data (VPD) from a storage device on said server. The BMC can compare the VPD from the storage device with a list of approved VPD. The BMC can issue an output in response to results of the comparing.

According to a second aspect of the present invention, there is provided a server including a baseboard management controller (BMC) and a storage device. The BMC is configured to obtain at least one piece of vital product data (VPD) from the storage device. The BMC is configured to compare the VPD from the storage device with a list of approved VPD. The BMC is configured to issue an output in response to results of comparing.

BRIEF DESCRIPTION OF THE DRAWINGS

Embodiments of the present invention will now be described, by way of examples only, with reference to the accompanying drawings, in which.

DETAILED DESCRIPTION OF THE EMBODIMENTS

The present invention allows for detection of an unsupported storage device on a server at runtime, and responding thereto.

A first step in such a process involves identifying whether the storage device(s) on a server is supported or not. In the arrangement shown in FIG. 1, a server 100 includes a number of serial attached SCSI (SAS) drives and/or serial AT attachment (SATA) drives 102a, 102b, 102c connected to a drive back plane 104 with a small computer system interface (SCSI) Enclosure Processor (SEP) 105. A Baseboard Management Controller (BMC) 106 of the server 100 is also connected with the drive back plane 104 via an Inter-Integrated Circuit ($I^2C$) 108. For accessing the SAS drives and/or SATA drives 102a, 102b, 102c, the BMC 106 is connected with a Redundant Array of Independent Disks (RAID)/host bus adapter (HBA) controller 110 via a Management Component Transport Protocol (MCTP) over Peripheral Component Interconnect Express (PCIe) (112). The RAID/HBA controller 110 is connected with the SAS drives and/or SATA drives 102a, 102b, 102c via the drive back plane 104.

The BMC 106 may access or be provided with a list or table (so called "White List") containing Vital Product Data (VPD) of supported storage devices. VPD is a collection of configuration and informational data associated with a particular set of hardware or software. In particular, VPD stores information such as part numbers, serial numbers, manufacturers, product identity (ID) details, etc. VPD data are usually burned onto EEPROMs associated with various hardware components.

Figure 1:
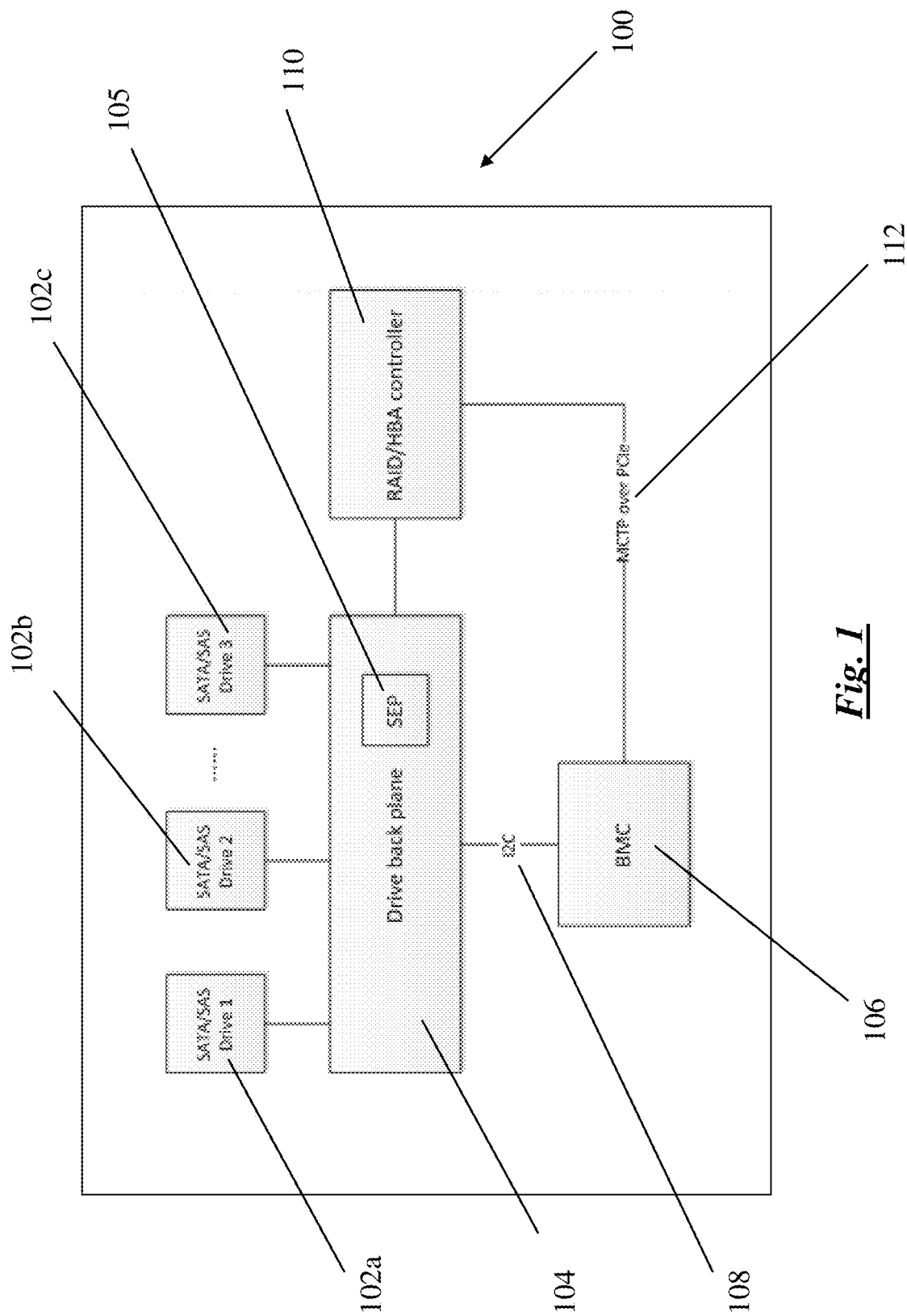
FIG. 1 is a schematic diagram of a server with a number of SATA/SAS drives according to a first embodiment of the present invention.

In the arrangement shown in FIG. 1, the BMC 106 may query the SAS drives and/or SATA drives 102a, 102b, 102c for their respective VPD by communicating with the RAID/HBA controller 110 through the MCTP over PCIe 112. The VPD of the SAS drives and/or SATA drives 102a, 102b, 102c thus obtained may then be compared with the VPD of supported storage devices in the White List. In case the VPD of any of the SAS drives and/or SATA drives 102a, 102b, 102c cannot be located in the White List, thus resulting in a negative comparing result, the BMC 106 can issue an output. Such an output may be an alert in the form of a visual and/or audio indication to a user, or instructions to cause the specific storage device(s) whose VPD cannot be located in the White List to assume STANDBY mode, whereby drive cache is flushed and I/O operation is stopped. In particular, the BMC 106 may command the SCSI enclosure processor (SEP) 105 on the back plane 104 of the server 100 to disconnect power supply to the specific SAS drive(s) or SATA drive(s) 102a, 102b, 102c whose VPD cannot be located in the White List, e.g. by the SEP 105 controlling the state of the drive's PWRDIS pin (P3). In addition, such an output may be a warning event, or that the system status be turned to warning. The customer may then check the system status and BMC events on BMC web graphic user interface (GUI) or other standard system management interfaces. The customer can also receive an e-mail if the event is subscribed as an e-mail alert.

Figure 2:
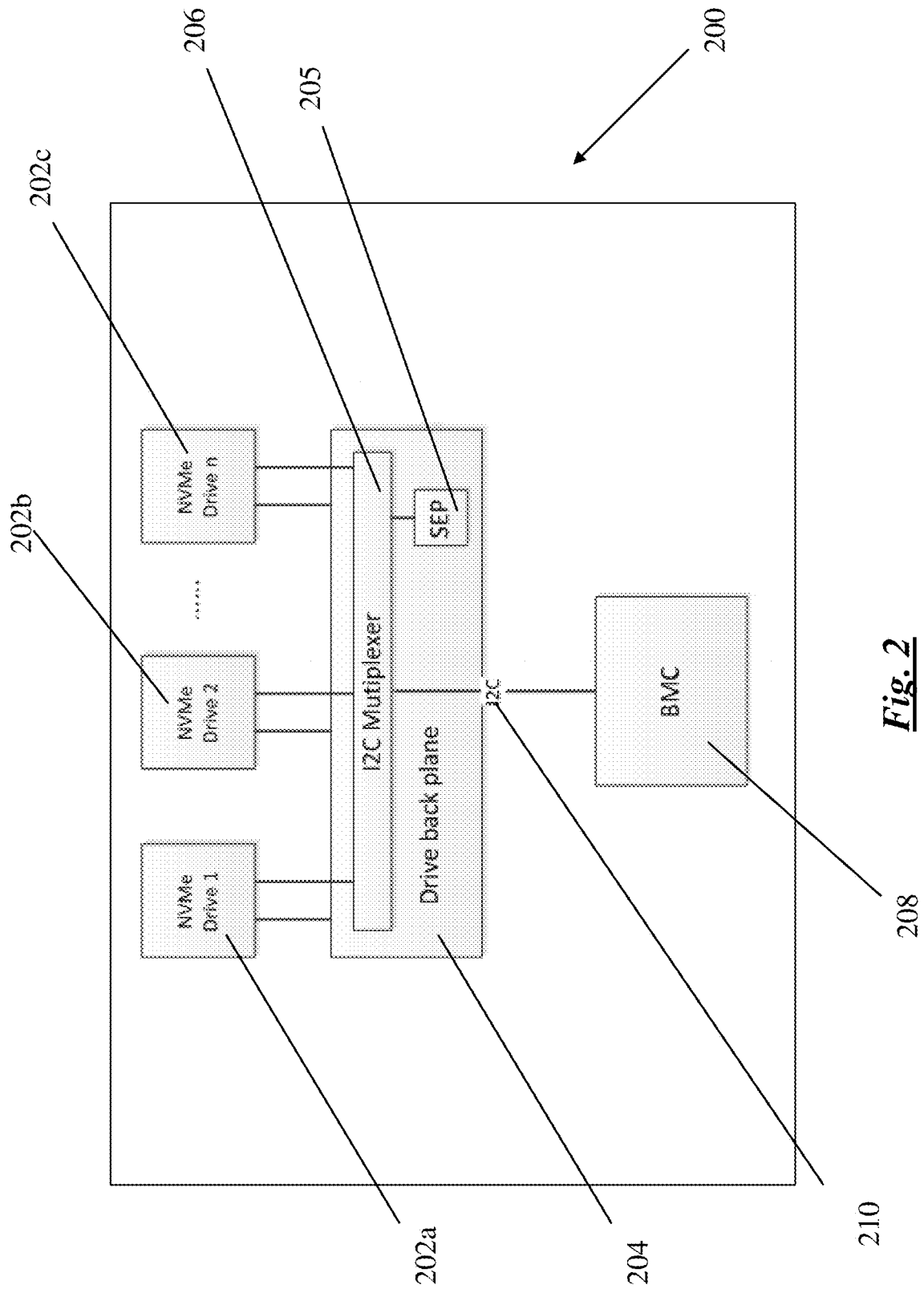
FIG. 2 is a schematic diagram of a server with a number of NVMe drives according to a second embodiment of the present invention.

In the arrangement shown in FIG. 2, a server 200 includes a number of NVMe drives 202a, 202b, 202c connected to a drive back plane 204 with a small computer system interface (SCSI) Enclosure Processor (SEP) 205. The NVMe drives 202a, 202b, 202c connected are also connected to an inter-integrated circuit (I²C) multiplexer 206. A Baseboard Management Controller (BMC) 208 of the server 200 is also connected with the drive back plane 204 via an Inter-Integrated Circuit (I²C) 210. The BMC 208 may then access the NVMe drives 202a, 202b, 202c and obtain their VPD via an NVMe management interface (MI) or an out-of-band (OOB) management channel over the I²C 210.

The VPD of the NVMe drives 202a, 202b, 202c thus obtained may then be compared with the VPD of supported storage devices in the White List. In case the VPD of any of the NVMe drives 202a, 202b, 202c cannot be located in the White List, thus resulting in a negative comparing result, the BMC 208 can issue an output. Such an output may be an alert in the form of a visual and/or audio indication to a user, or instructions to cause the specific storage device(s) whose VPD cannot be located in the White List to assume STANDBY mode, whereby drive cache is flushed and I/O operation is stopped. In particular, the BMC 208 may command the SCSI enclosure processor (SEP) 205 on the back plane 204 of the server 200 to disconnect power supply to the specific storage device(s) whose VPD cannot be located in the White List, e.g. by the SEP 205 controlling the state of the drive's PWRDIS pin (P3). In addition, such an output may be a warning event, or that the system status be turned to warning. The customer may then check the system status and BMC events on BMC web graphic user interface (GUI) or other standard system management interfaces. The customer can also receive an e-mail if the event is subscribed as an e-mail alert.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A method of identifying an unsupported storage device on a server, the method comprising:
providing the server with a baseboard management controller (BMC), the server storing one or more approved vital product data (VPD),
providing a plurality of storage devices on the server, the storage devices each having its respective VPD stored thereon,
the BMC obtaining, from each storage device via an inter-integrated circuit (I²C) device and an I²C multiplexer operative connected to each of the storage devices, at least one piece of the VPD stored on each of the storage devices, wherein the at least one piece of VPD is obtained from each storage device via a redundant array of independent disks (RAID) controller or a host bus adapter (HBA) controller in the server via a management component transport protocol (MCTP) over peripheral component interconnect express (PCIe),
the BMC comparing the at least one piece of the VPD obtained from each storage device to the one or more approved VPD, and
taking action at the BMC, via the I²C device and the I²C multiplexer, to communicate an output, restrict interaction by the server with one of the storage devices, or permit interaction by the server with one of the storage devices, based on the comparison.

2. The method of claim 1, wherein the storage devices include a serial attached SCSI (SAS) drive, a serial AT attachment (SATA) drive, or a non-volatile memory express (NVMe) drive.

3. The method of claim 2, wherein each storage device is connected to the I²C device via the I²C multiplexer.

4. The method of claim 2, wherein obtaining at least one piece of VPD comprises obtaining the at least one piece of VPD from each storage device via an NVMe management interface or an out-of-band (OOB) management channel.

5. The method of claim 4, wherein obtaining at least one piece of VPD comprises obtaining the at least one piece of VPD from each storage device via the NVMe management interface over the I²C device.

6. The method of claim 1, wherein, in response to a mismatch between the at least one piece of VPD from one of the storage devices with the one or more approved VPDs, the BMC issuing an alert to a user.

7. The method of claim 1, wherein, in response to a mismatch between the at least one piece of VPD from one of the storage devices with the one or more approved VPDs, the BMC forcing the respective storage device to STANDBY mode by communication via the I²C device.

8. The method of claim 1, wherein, in response to a mismatch between at least one piece of VPD from one of the storage devices with the one or more approved VPDs, the BMC commanding a processor on a backplane of the server via the I²C device to disconnect power supply to the respective storage device.

9. A server comprising:
a baseboard management controller (BMC), and
a storage device,
the BMC being configured to obtain at least one piece of vital product data (VPD) from each of a plurality of storage devices via an inter-integrated circuit (I²C) device and an I²C multiplexer operative connected to each of the storage devices, wherein the at least one piece of VPD is obtained from each storage device via a redundant array of independent disks (RAID) controller or a host bus adapter (HBA) controller in the server via a management component transport protocol (MCTP) over peripheral component interconnect express (PCIe),
the BMC being configured to compare the VPD from each of the storage devices with one or more approved VPDs, and
the BMC being configured to take action, via the I²C device and the I²C multiplexer, to communicate an output, restrict interaction by the server with one of the storage devices, or permit interaction by the server with one of the storage devices, based on the comparison.

10. The server of claim 9, wherein the storage devices comprise a serial attached SCSI (SAS) drive, a serial AT attachment (SATA) drive or a non-volatile memory express (NVMe) drive.

11. The server of claim 9, wherein the BMC is configured to obtain the at least one piece of VPD from each storage device via a NVMe management interface or an out-of-band (OOB) management channel.

12. The server of claim 11, wherein the BMC is configured to access and obtain the at least one piece of VPD from each storage device via the NVMe management interface over the I²C device.

13. The server of claim 9, wherein the BMC is configured to issue an alert to a user in response to a mismatch between the VPD from one of the storage devices with one or more approved VPDs.

14. The server of claim 9, wherein, in response to a mismatch between the at least one piece of VPD from one of the storage devices with the one or more approved VPDs, the BMC is operable to force the respective storage device to STANDBY mode by communication via the I²C device.

15. The server of claim 9, wherein, in response to the mismatch, the BMC commands a processor on a backplane of the server via the I²C device to disconnect power supply to the respective storage device.

16. The server of claim 9, wherein the at least one piece of VPD from one of the storages device comprises any one of part numbers, serial numbers, manufacturers and product identity (ID) details of the storage device.

* * * * *